Figure 1:
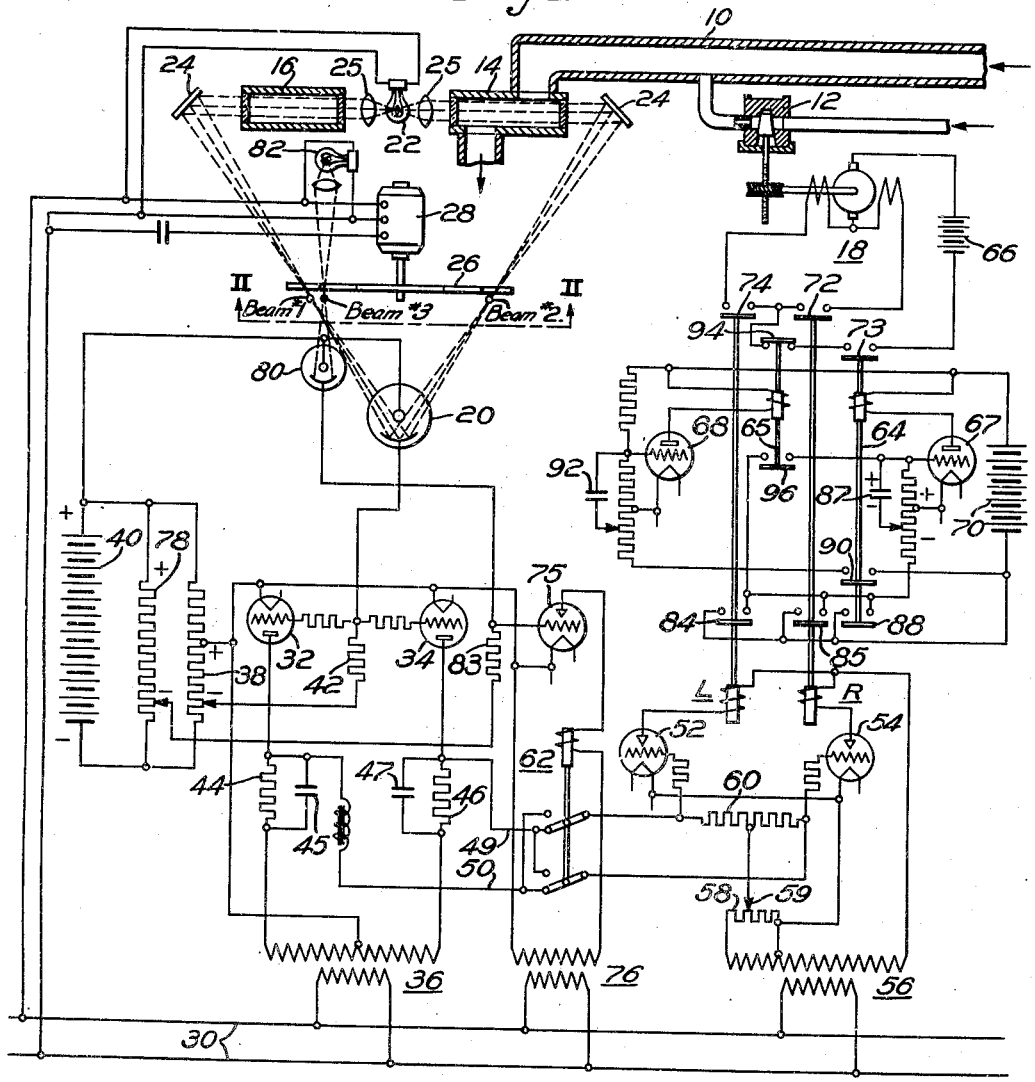

Jan. 5, 1937.　　　F. H. GULLIKSEN　　　2,066,934

REGULATING SYSTEM

Filed Dec. 12, 1934

WITNESSES:

INVENTOR
Finn H. Gulliksen.
BY
ATTORNEY

Patented Jan. 5, 1937

2,066,934

UNITED STATES PATENT OFFICE 2,066,934

REGULATING SYSTEM

Finn H. Gulliksen, Wilkinsburg, Pa., assignor to Westinghouse Electric & Manufacturing Company, East Pittsburgh, Pa., a corporation of Pennsylvania Application December 12, 1934, Serial No. 757,239

4 Claims. (Cl. 250—41.5)

My invention relates to electrical regulators and it has particular relation to regulating systems capable of matching a colorimetric characteristic, such as opacity, of the treated material with that of a reference or standard material having the desired character or constituency.

All past schemes for automatic colorimetric process regulation with which I am familiar have possessed a number of operating disadvantages and other undesirable features. For example, in one arrangement well known to the prior art, two light-sensitive photo-tubes are used simultaneously to inspect the light transmitted through a sample of an unknown liquid or reflected by an unknown surface and the light transmitted through a standard colorimetric sample representing the desired quantity of the variable chemical or other ingredient. Because of discrepancies in characteristics which develop within the tubes, recalibration of the system is required from time to time. Likewise, variations in the energizing voltage supplied to the control circuits also objectionably affect the calibration, and, in addition, the use of two photo-tubes may be undesirable from an equipment duplication standpoint.

It is to the overcoming of these and other disadvantages and to the provision of further improvements that the present invention is primarily directed.

One object of the invention is to provide a colorimetric regulating system which utilizes but a single photo-tube to inspect simultaneously the light transmitted or reflected by the unknown sample and the light transmitted or reflected by the known sample.

Another object is to provide a regulating system of the above-mentioned character which acts to create a zero response by the equipment when the percentage of the varying ingredient is correct.

A further object is to provide a system of this type in which discrepancies in photo tube characteristics or variations in the control circuit supply voltage do not alter the regulator calibration.

A still further object is to provide improved means whereby when a corrective action has been made, a second or further correction can be effected only after the first has had an opportunity to register its effect upon the photo-tube.

In a preferred embodiment of my invention, I direct beams produced by a single light source through two different paths onto a single photo tube in such manner that one beam passes through a standard color sample and the other beam passes through or is reflected by the unknown sample. In the paths of the two beams, I rotate a shutter or diaphragm which is so apertured as to alternately interrupt the beams. If the light transmitting or reflecting qualities of the two liquids or surfaces are identical, the illumination of the photo tube will remain unchanged as the diaphragm is rotated, and no corrective action will result.

However, if the light transmitting quality of one of the samples differs from that of the other, the illumination of the photo tube will vary as the diaphragm is rotated. Through the use of specially arranged electronic tubes and relay control equipment, this variation is caused to initiate corrective adjustments in the rate of variable ingredient supply which are appropriate to restore the regulated fluid or surface to a character corresponding to that of the standard sample. Incorporated in this control equipment are means which function to so periodically interrupt the corrective action as to allow its effect to properly influence the photo-tube before being further proceeded with.

Figure 2:
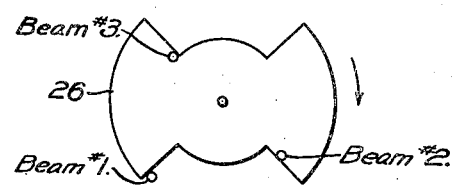

My invention itself, together with additional objects and advantages thereof, will best be understood through the following description of a specific embodiment when taken in conjunction with the accompanying drawing, in which:

Figure 1 is a diagrammatic view of apparatus and circuits showing the improved regulating system of my invention applied to regulate the concentration of an ingredient supplied to a fluid under course of treatment; and Fig. 2 is a view taken on the line II—II illustrating the character of the shutter or apertured diaphragm which, in the system of Fig. 1, is rotated in the light beam paths.

Referring to the drawing, the liquid whose concentration is to be regulated is fed through a conduit 10 from a suitable source of supply, in which conduit there is added thereto, at a rate determined by the adjustment of a valve 12, a treating substance, the presence of which alters the light transmitting characteristics of the major liquid. The mixture is passed through a section 14, the ends of which are constructed of glass or other transparent material, through which light may readily be passed.

A second section 16 of dimensions comparable to those of section 14 is provided to contain a quantity of liquid possessed of those standard concentration characteristics which it is desired to maintain in the liquid passing through conduit section 14. To adjust the setting of the concentration control valve 12, a reversible motor 18 is provided. The regulating system of my invention about to be described functions to so operate motor 18 in response to deviations in the light transmitting qualities of the liquid in conduit 14 from those of the sample or reference liquid in conduit 16 as to maintain the two liquids of the same concentration.

In the embodiment shown, my improved system comprises a photo tube 20 upon which a light source 22 directs, by the aid of suitable lenses 25 and mirrors 24, through the liquid in the sample conduit section 16 and through the treated liquid in conduit section 14, two beams of light identified in the drawing as beam #1 and beam #2, respectively. In the path of these two beams, I position a diaphragm or shutter 26 provided with the apertures illustrated in Fig. 2 and mounted upon the shaft of a synchronous motor 28, which derives its energization from a source of alternating-current voltage represented by conductors 30.

The photo tube 20 comprises the control element of a bridge circuit in which are included a pair of electronic tubes 32 and 34 of the triode vacuum type, the major element circuits of which have impressed thereon an alternating-current voltage supplied from source 30 through a transformer 36. In the connection shown, the anode of each of the tubes has impressed thereon a positive voltage during the half cycle that the anode of the other tube is energized by a negative voltage. The tube grid elements are maintained at a small value of negative bias with respect to the cathode or filament elements by the voltage appearing across a section 38 of a potentiometer resistor which is energized from a source 40 of unidirectional voltage, with which source the photo tube 20 is also connected through a circuit which includes a resistor 42.

In the particular system represented, the synchronous motor 28 is adapted to rotate the shutter 26 through one complete revolution for each two cycles of the voltage of supply circuit 30. The representation of Fig. 2 shows the positioning of the shutter with respect to light beams #1 and #2 at the beginning of one of these cycles. The effect of the illustrated arrangement is that light beam #1, for example, will, during each of the half cycles during which electronic tube 32 has impressed thereon a wave of positive voltage, be permitted to fall upon the photo tube 20, while beam #2 will similarly fall upon the photo tube during the remaining alternate half cycles during which electronic tube 34 is subjected to a positive anode voltage from the transformer 36.

In the anode circuits of each of these tubes, I connect a resistor which is shunted by a capacitor, these elements being indicated for the two tubes named at 44 and 45 and at 46 and 47. As long as the light transmitting qualities of the liquids in conduit sections 14 and 16 are identical, the illumination of the photo tube 20 will remain unchanged as the shutter 26 is rotated. However, any variation in the opaqueness of the two liquids causes the photo tube illumination to be stronger during alternate half cycles than it is during the remaining. This change in illumination effects a corresponding change in the current drawn by the photo tube through the resistor 42. The voltage drop through this resistor tends to make the grid elements of the tubes 32 and 34 more positive.

As long as the drop remains constant, both tubes will be balanced and the pulsating direct currents drawn thereby through resistors 44 and 46 will maintain the capacitors 45 and 47 charged to exactly the same potentials. For such a condition, there will be no potential difference between bridge output conductors 49 and 50. However, a change in the drop through resistor 42 in one direction during alternate half cycles will raise the current of one of the two tubes and lower that of the other, with the result that there will be a corresponding unbalance between the charge of the capacitors 45 and 47 and a unidirectional voltage of one polarity will appear between conductors 49 and 50. A change in the opposite direction of the photo tube current will effect a reversal of this output potential.

The concentration adjusting motor 18 is operated in its concentration lowering and raising directions, respectively, upon a selective actuation of relays L and R. These two relays are in turn supplied with energizing current through a pair of electronic tubes 52 and 54 which are illustrated as being of the gas-filled grid controlled variety. Energizing current for these tubes is supplied from source 30 through a transformer 56. One end of the secondary winding of this transformer is provided with a potentiometer resistor 58, along the length of which a selectivity-adjusting tap 59 may be moved to vary the negative bias normally supplied to the tube grid elements through a connection which includes a mid-tapped resistor 60. The character of this bias is such as to normally maintain both tubes non-conductive.

For the purpose of rendering one or the other of the tubes selectively conductive, the resistor 60 in the grid control circuit thereof is connected, through a reversing switch 62 provided for a purpose to be later explained, with the output conductors 49 and 50 of the photo tube controlled bridge circuit previously described. When the bridge output potential is of one polarity, one of the tubes is rendered conductive to operate the motor 18 in one direction; while when the bridge polarity is reversed, the other of the tubes functions to initiate operation of the motor 18 in the opposite direction.

For the purpose of insuring that the motor operation will not be continuous, but will rather be of a spaced impulse variety especially matched with the response characteristics of the concentration adjusting apparatus controlled thereby, I additionally provide in association with the relays L and R special time delay apparatus represented as comprising a pair of relays 64 and 65, a pair of triode tubes 67 and 68 of the vacuum variety, and a source 70 of unidirectional potential for energizing these time delay circuits.

To facilitate an explanation of the operation of the equipment thus far described, let it be assumed that the phase relations between the motor-driven shutter 26 and the voltage of supply circuit 30 are such that when the shutter allows beam #1 to fall upon the photo tube 20, the vacuum tube 32 is receiving a positive anode voltage, and that during the remaining half cycles when beam #2 is permitted to reach the photo tube, the tube 34 is similarly positively energized. As long as the concentration of the liquid passing through conduit section 14 is identical with that of the sample in section 16, the illumination of photo tube 20 will remain constant, the current passed by the two tubes 32 and 34 will also be balanced and no potential will appear between the output conductors 49 and 50 of the bridge circuit. For this condition, as before explained, both of the relay control tubes 52 and 54 are maintained non-conductive, and the concentration adjusting motor 18 will remain inoperative.

In the event that the concentration of the liquid passing through conduit section 14 falls below the desired value, and thereby renders the liquid less opaque, light beam #2 will become stronger than beam #1, with the result that photo tube 20 will pass more current during the positive half cycles of anode voltage applied to tube 34 than during the negative half cycles. The increased current through resistor 42 during these half cycles makes the grid bias of tube 34 more positive when the anode is positive, and thereby raises the current drawn through resistor 46 and the voltage to which capacitor 47 is charged. In consequence, the bridge output conductor 49 will be maintained at a negative potential with respect to conductor 50.

This potential in being impressed upon resistor 60 renders the right-hand end of this resistor positive with respect to the left-hand end. This so reduces the negative grid bias impressed upon tube 54 as to render the tube conductive to pass through the actuating winding of relay R a current which effects an actuation of this relay.

Contact member 72 of the relay, in moving upwardly, sets up a circuit, which is completed by a contact member 73 of relay 64 in a manner to be further explained, for energizing, from a source of power 66, the motor 18 in the concentration-raising direction. In the spaced-impulse-manner further to be described, the motor adjusts valve 12 in the opening direction and thereby increases the concentration of the regulated fluid.

In the event that the concentration of this liquid raises above the desired value, light beam #2 becomes weaker than standard reference beam #1 and causes the photo tube 20 to pass more current during the positive half cycles of anode voltage supplied to the tube 32. This increases the charge assumed by capacitor 45 with the result that bridge output conductor 49 becomes positive with respect to conductor 50. The left-hand end of resistor 60 is then made positive with respect to the right-hand end and this causes tube 52 to become conductive and effect an actuation of motor-control relay L. As a result of this actuation, the motor 18 is energized, through relay contact member 74, in the concentration lowering direction to effect the necessary corrective adjustment.

The assumption made at the beginning of the operation explanation relative to the phase relation between the motor-driven shutter 26 and the voltage of supply circuit 30 did not take account of the fact that upon starting the equipment the motor may fall into synchronism into the opposite phase relation, in which case, some means must be provided for reversing the connection between the photo-cell controlled bridge circuit and the grid control circuits of the motor actuating relay tubes 52 and 54. In order that this connection may be automatically shifted in case such shift is necessary when the equipment is started up, I provide the before mentioned reversing switch 62, the actuation of which is controlled by means of an electronic tube 75 energized from the source of supply 30 through a transformer 76.

In the grid control circuit of this tube, I provide an auxiliary photo tube 80 which is arranged to be illuminated by a light source 82 which directs thereon light beam #3. The grid of tube 75 is maintained, by the voltage appearing across the section 78 of a resistor which is energized by the source 40, at a potential sufficiently negative with respect to the tube cathode as to render the tube non-conductive, unless the tube 80 is illuminated during those half cycles of voltage during which a positive potential is impressed upon the tube anode. In such case, the photo tube draws through resistor 83 a current sufficient to decrease the magnitude of this grid bias to the point where the tube does become conductive and functions to bias the blades of switch 62 into the upward position, in which the connection of the control circuits of motor control relays L and R with bridge output conductors 49 and 50 is reversed.

When the phase position of the motor-driven shutter 26 with respect to the voltage of supply circuit 30 is of the character mentioned in the first described assumption, light beam #3 will, as reference to Fig. 2 will show, be interrupted during the positive half cycles of voltage impressed upon the anode of tube 75, and no conductivity of the tube can accordingly result. In this situation, the blades of reversing switch 62 will occupy the downward biased position illustrated.

However, in the event that the phase relation between the shutter 26 and the supply voltage becomes reversed, then the periods of illumination of photo tube 80 are coincident with the positive half cycles of anode voltage impressed upon tube 75, and the tube is rendered and maintained conductive so that the current passed therethrough actuates to and holds the blades in the upwardly biased position in which the control circuit connections are appropriately set up for permitting proper operation of the complete regulating system.

Considering now the manner in which the before referred to spaced-impulse corrective actions are effected, an actuation of either the motor control relay L or R completes through contact members 84 or 85 of these relays a circuit through which vacuum tube 67 is energized from the direct-current source 70. By virtue of the presence in the grid control circuit of a capacitor 87, the grid bias of the tube is at the instant of this energization so negative that the current passed by the tube is insufficient to actuate the relay 64. As this capacitor attains a charge, however, the magnitude of this grid bias is changed in the positive direction and after an appropriate time delay, which may be of the order of several seconds, relay 64 moves upwardly to the actuated position in which it locks itself through the medium of a contact member 88. At the same time contact member 73 of the relay completes the energizing circuit set up by relay L or R for motor 18, and thus starts operation of this motor.

This operation continues until, as a result of a completion by a contact member 90 of relay 64 of an energizing circuit for electronic tube 68, a capacitor 92 associated with the grid circuit of this tube has become sufficiently charged to reduce the negative bias impressed upon the tube grid sufficiently to allow the tube to actuate relay 65. As in the preceding case, the time required for the capacitor 92 to properly charge may be regulated within relatively wide limits.

In actuating, relay 65 interrupts, by means of contact member 94, the energizing circuit of motor 18 and thereby discontinues motor operation. By means of a contact member 96, furthermore, the relay restores the bias impressed upon the grid of tube 67 to the original negative value and thereby allows the relay 64 to move to the unactuated position illustrated.

In the event that either of the two relays L or R continue in their actuated positions, the cycle just described will be completed, and a proper control of the quantity adjusting motor 18 effected thereby. However, should, during the progress of the mentioned cycle, the motor control relay return its contact members to the unactuated position represented, operation of the quantity adjusting motor will, of course, cease upon the completion of the cycle. On the other hand, should, during the progress of the cycle, the originally actuated motor control relay return to its unactuated position and the other relay be actuated, immediate reversal of the direction of rotation of the quantity adjusting motor 18 will take place.

Although I have shown and described a certain specific embodiment of my invention, I am fully aware that many modifications thereof are possible. My invention, therefore, is not to be restricted, except insofar as is necessitated by the prior art and by the scope of the appended claims.

I claim as my invention:

1. A regulating system comprising a source of light, a photo tube, means for directing upon the tube from said source a beam of light through a treated fluid and a second beam through a standard sample, a bridge circuit comprising a pair of electronic tubes, and alternating-current voltage means adapted to impress thereon positive potentials during different half cycles, means for causing said photo-tube to control the conductivity of said electronic tubes, means operating synchronously with the tube energizing voltages for alternately interrupting said two light beams, means controlled by the bridge-circuit output for adjusting a characteristic of the treated fluid, and means responsive to an opposing phase relation between said light beam interruptions and said tube energizing voltages for reversing said bridge output connections.

2. In a regulating system comprising a photo tube, a light beam directed thereon, a bridge circuit comprising an electronic tube and alternating-current voltage means adapted to impress thereon a positive potential during alternate half cycles, means for causing said photo tube to control the conductivity of said electronic tube, means controlled by the bridge-circuit output for adjusting a characteristic to be maintained constant, and means operating synchronously with the tube energizing voltage for intermittently interrupting said light beam, the combination of means responsive to an opposing phase relation between said light-beam interruptions and said tube energizing voltage for reversing said bridge output connections.

3. In a regulating system, the combination of a source of light, a photo tube, means for directing upon the tube from said source a beam of light the intensity of which varies with a colorimetric characteristic of a treated material and a second beam of an intensity corresponding to the desired value of said characteristic, a bridge circuit comprising a pair of electronic tubes, alternating-current voltage means for impressing thereon positive potentials during different half cycles, a capacitor connected in circuit with each of said tubes, means for causing the photo-tube to control the conductivity of said electronic tubes, means sensitive to the difference in the voltages of said capacitors for adjusting said treated material, a member so apertured and positioned that when rotated it alternately interrupts said two light beams, and a synchronous motor energized by said alternating-current voltage for rotating said member at a speed which changes said beam interruptions every half cycle.

4. A regulating system comprising a source of light, a photo tube, means for directing upon the tube from said source a beam of light the intensity of which varies with a colorimetric characteristic of a treated material and a second beam of an intensity corresponding to the desired value of said characteristic, means for alternately interrupting said two beams, a bridge circuit comprising a pair of electronic tubes adapted to be controlled by the photo tube, a circuit for impressing an alternating-current voltage upon the bridge circuit in a manner to positively energize said two tubes during different half cycles, means operating synchronously with the tube energizing voltages for alternately interrupting said two light beams, means controlled by the bridge-circuit output for adjusting said characteristic of the treated material, and means responsive to an opposing phase relation between said light beam interruptions and said tube energizing voltages for reversing said bridge output connections.

FINN H. GULLIKSEN.